United States Patent [19]

Baker

[11] Patent Number: 5,211,373
[45] Date of Patent: May 18, 1993

[54] GATE VALVE HAVING EXPANDING GATE AND FLOATING SEATS

[76] Inventor: Dwight Baker, P.O. Box 249, Rush Springs, Okla. 73082

[21] Appl. No.: 803,912

[22] Filed: Dec. 9, 1991

Related U.S. Application Data

[63] Continuation of Ser. No. 612,862, Nov. 14, 1990, abandoned.

[51] Int. Cl.$^5$ ................................................ F16K 3/16
[52] U.S. Cl. ...................................... 251/196; 251/328
[58] Field of Search ............... 251/196, 197, 200, 328, 251/193, 368

[56] References Cited

U.S. PATENT DOCUMENTS

| | | | |
|---|---|---|---|
| 2,797,063 | 6/1957 | Hobbs | 251/193 X |
| 2,954,960 | 12/1956 | Dunbar et al. | 256/196 |
| 3,006,601 | 12/1961 | Anderson et al. | 251/196 |
| 3,348,567 | 1/1965 | Volpin | 137/246.12 |
| 3,871,616 | 3/1975 | Taylor | 251/368 X |
| 4,044,997 | 8/1977 | Schelat | 251/328 |
| 4,208,035 | 6/1980 | Alvarez et al. | 251/328 X |
| 4,320,890 | 3/1982 | Meyer et al. | 251/328 |
| 4,363,465 | 12/1982 | Morrill | 251/214 |
| 4,376,526 | 3/1983 | Freeman | 251/328 |
| 4,401,292 | 8/1983 | Whaley | 251/196 X |
| 4,471,943 | 9/1984 | Nelson | 251/327 |
| 4,489,918 | 12/1984 | Kalsi | 251/328 |
| 4,519,582 | 5/1985 | Freeman | 251/328 |
| 4,531,710 | 7/1985 | Tort | 251/167 |

OTHER PUBLICATIONS

W-K-M Joy information sheets relating to "POW-R-SEAL (Model M) and WP SAF-T-SEAL" Gate valves.
Seaboard WEllhead, Inc. Valve information sheet.
Inson Gate Valve information sheet.
Barton Valve Company, Inc. Gate Valve Cutaway.
BCF Series G-2 Gate Valve information sheet.

*Primary Examiner*—John C. Fox
*Attorney, Agent, or Firm*—Nies, Kurz, Bergert & Tamburro

[57] ABSTRACT

An expanding gate valve having replaceable valve seats that are capable of longer operating life than conventional valve seats. The valve seats of the present invention have sealing faces that are case hardened to a hardness of about Rockwell 60 C and are devoid of resilient sealing rings in the sealing faces. Additionally, the seats are of floating construction, and are adapted to move both axially and to tilt relative to the seat recesses that are provided in the valve body. Finally, a resilient biasing arrangement is provided at the rear portion of the seat to bias it outwardly relative to the seat recesses to insure substantially complete surface engagement between the sealing face of the seat ring and the face of the respective gate surface.

3 Claims, 2 Drawing Sheets

GATE VALVE HAVING EXPANDING GATE AND FLOATING SEATS

This application is a continuation of application Ser. No. 07/612,862, filed Nov. 14, 1990, now abandoned.

BACKGROUND OF THE INVENTION

1. Field of the Invention

This invention relates to expanding-gate-type gate valves. More particularly, the invention relates to a gate valve having an expanding gate and including replaceable valve seat inserts in which the valve seat inserts are removably received in recesses formed in the valve body, engage the opposite faces of the expanding gate, and have a longer effective operating life.

2. Description of the Related Art

Gate valves are used in a large number of fluid flow systems for flow control purposes. A generally rectangular solid gate member is provided having a pair of spaced, parallel faces that include a through passageway that extends through the gate member from one face to the other. The through passageway is positioned adjacent one end of the gate and the gate is adapted to be moved within the gate valve body to alternately bring the through passageway into and out of registry with a flow passageway to selectively permit flow through the valve and to prevent flow through the valve. A pair of valve seats are provided within the valve body and are so positioned on opposite faces of the gate that they engage the gate faces. The valve seats are provided to prevent flow around the gate rather than through the gate.

Because of their effectiveness to control flow of fluids, gate valves are often used in oil field applications. Frequently, such valves have an expanding gate to insure zero flow through the valve when the valve is in the closed position. However, because drilling fluids that are used to facilitate the drilling process often contain gritty materials and particles, valves used in such applications are subject to considerable wear, thereby resulting in the need to frequently replace the valve seats in order not to experience excessive leakage through such valves.

One solution that has been devised to solve the wear problem has been to provide a resilient sealing ring that is retained in the face of the valve seat that faces the gate face, both to provide a wiping action on the surface of the gate, and also to physically space the metallic portion of the seat from the gate and thereby reduce the frictional wear that would otherwise result when grit or other particles find their way between the valve seat and the gate. Oftentimes the annular sealing rings, which usually are made from a polytetrafluoroethylene (Teflon) material, are held in annular recesses formed in the face of the seats, the annular recesses having inwardly facing serrations on their inner surfaces to provide gripping surfaces to aid in retaining the sealing ring in position. However, the formation of such grooves and serrations adds substantially to the cost of such seats.

In addition to the additional cost, the resilient sealing rings are often damaged in use. Frequently, pressurized fluid seeps around the ring to enter the recess, which results in an outward force tending to force the ring out of the recess. As a result the ring partially extends into the passageway in the gate and is cut by the edge of the gate passageway as the gate moves over the sealing ring during opening and closing of the gate. Consequently, pieces of the rings are severed from the ring bodies, and result in hollowed-out spaces within which particulate matter can collect and further increase the wear problem. Valve seats incorporating such annular sealing rings are shown in U.S. Pat. No. 4,376,526, which issued on Mar. 15, 1983, to John W. Freeman, and in U.S. Pat. No. 4,471,943, which issued on Sep. 18, 1984, to Norman A. Nelson.

The prior art expanding gate valves also included seats that were force fit into the valve body. In that regard, U.S. Pat. No. 2,954,960, which issued on Oct. 4, 1960, to Calvin D. Dunbar et al., and U.S. Pat. No. 4,489,918, which issued on Dec. 25, 1984, to Manmohan S. Kalsi show such fixed seats. Alternatively, seats having limited axial movement are disclosed in the Nelson U.S. Pat. No. '943 patent.

It is an object of the present invention to overcome the problems attendant with the known expanding gate valve structures.

It is another object of the present invention to provide an expanding gate valve structure in which the valve seats do not contain resilient sealing rings in the sealing faces, and are also resistant to wear.

It is a still further object of the present invention to provide a simple, relatively inexpensive, and uncomplicated valve seat that provides greater longer operating life and is easy to replace.

SUMMARY OF THE INVENTION

Briefly stated, in accordance with one aspect of the present invention, a gate valve is provided having an expanding gate. The valve includes a valve body that has a flow inlet and a flow outlet, and a flow passageway that extends between the inlet and outlet and having a flow axis. A gate member is positioned within the valve body and is movable transversely relative to the flow passageway axis to selectively open and close the flow passageway. The gate member includes a pair of abutting gate elements each having opposed wedge surfaces inclined relative to the flow passageway axis in order to permit the gate elements to be moved relative to each other along respective wedge surfaces to expand the gate member in a direction along the flow passageway axis.

Each of the gate elements has an outwardly facing planar face surface, and the gate member includes a gate passageway for alignment with the flow passageway to permit flow through the gate member at one position of the gate member and to prevent flow through the gate member at a second position of the gate member. A spring is carried by the gate member for urging the gate elements together.

Annular seats are provided to be positioned within the valve body in spaced relationship along the flow axis and on either side of the expanding gate. The seats have a flow passageway and include an annular seat face that is adapted for engagement with the face of a respective gate element, the seat face including a planar sealing surface that is without protrusions of any type. The seat face is adapted to tightly and sealingly engage a gate face surface and includes a substantially coaxial, closed circular groove. A biasing arrangement is provided on the seat at the end opposite from the seat face to urge the seat face into contacting relationship with the gate face surface. The biasing arrangement and the seat recess in the valve body are so sized as to permit axial movement of the sealing ring relative to the seat recess, and also to permit angular tilting of the sealing ring relative to the axis of the seat recess, in order to maintain surface-to-surface contact between the seat face and the gate surface with which it is in engagement. The seat face has a surface hardness of about 60 on the Rockwell C scale.

DESCRIPTION OF THE PREFERRED EMBODIMENTS

Figure 1:
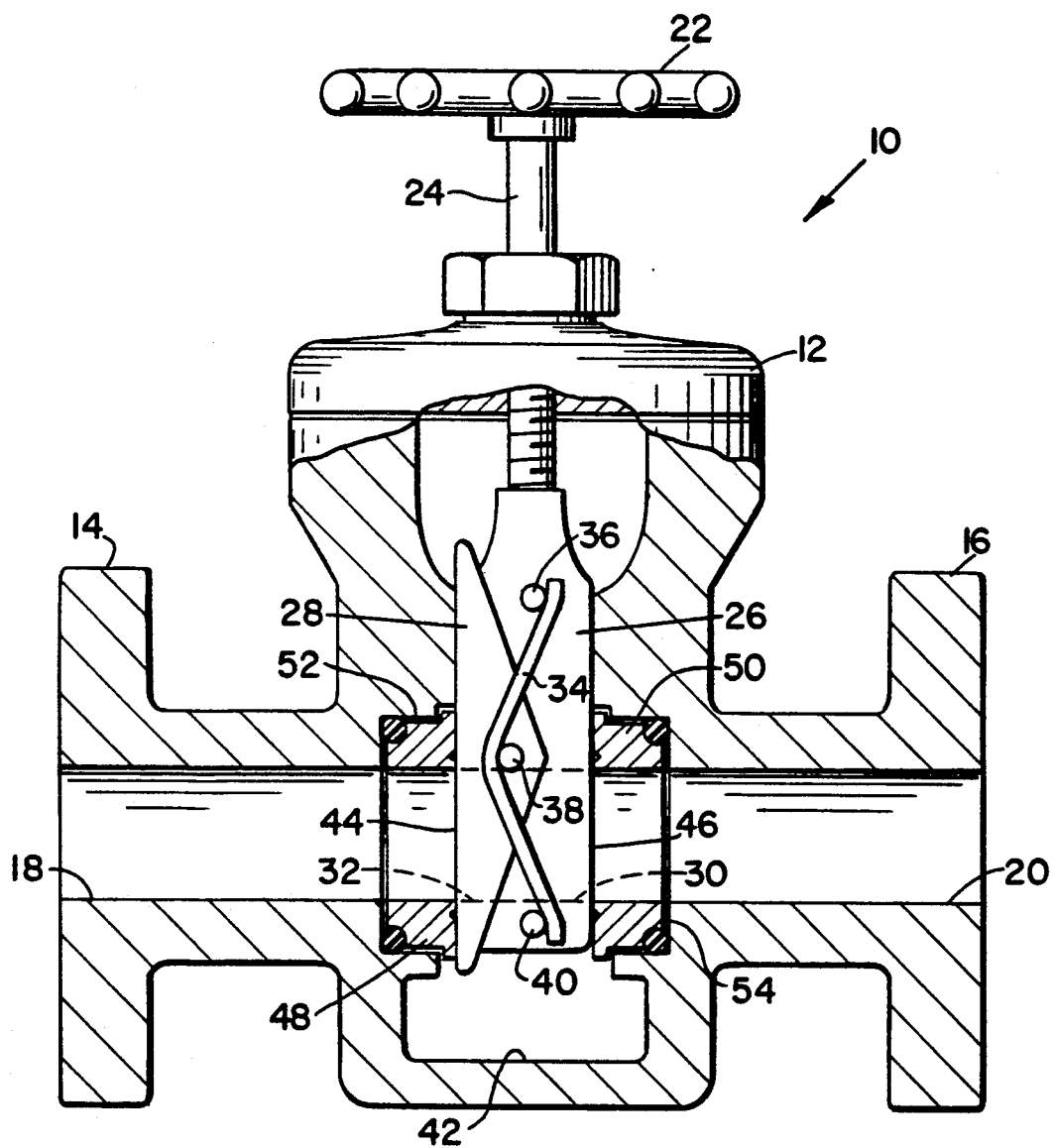
FIG. 1 is a side elevational view, partially in section, showing the internal structure of an expanding gate valve in accordance with the present invention.

Referring now to the drawings, and particularly to FIG. 1 thereof, there is shown a gate valve 10 including a housing 12 that has an inlet end flange 14 and an outlet end flange 16 spaced from each other along a flow passageway axis that extends through housing 12. Inlet end flange 14 includes an inlet passageway 18, and outlet end flange 16 includes an outlet passageway 20. A hand wheel 22 is positioned at the end of a rotatable stem 24 that extends outwardly from the housing. Stem 24 terminates within the housing 12 and is connected with a gate member 26 in such a way that rotation of hand wheel 22 causes movement of gate member up or down, as viewed in FIG. 1. A wedge member 28 is positioned against gate member 26 so that respective inclined surfaces in each of members 26 and 28 are in contact with each other.

Gate member 26 and wedge member 28 include respective aligned passageways 30, 32, that define a through passageway in the gate to permit flow between inlet passageway 18 and outlet passageway 20 when the gate member passageways are aligned with the flow passageway within valve 10. When hand wheel 22 is turned to cause stem 24 to move further into housing 12, gate member 26 and wedge member 28 move as a unit in a downward direction, as viewed in FIG. 1, until gate passageway 30 and wedge passageway 32 are no longer in registry with the respective inlet and outlet passageways 18, 20, thereby preventing flow through the valve.

Gate member 26 and wedge member 28 include a pair of opposed, cooperating wedge surfaces that define a flattened V-shaped intersection between those members. A pair of spaced pins 36, 40 are provided on each side of gate member 26, and a pair of outwardly extending pins 38 (only one of which is visible in FIG. 1) are provided in the corresponding side surfaces of wedge member 28. A gate spring 34 in the form of a steel rod is provided between the respective pins 36, 38, and 40 to hold the gate member 26 and wedge member 28 in contact with each other so that the respective V-shaped surfaces of the gate member and wedge member are in complete engagement and the gate has a minimum thickness. Any relative movement in an upward or downward direction between wedge member 28 and gate member 26 results in relative movement along the wedge surfaces, thereby increasing the gate face-to-face thickness.

Thus, when hand wheel 22 is turned to cause stem 24 to retract into housing 12, both gate member 26 and wedge member 28 move downwardly as a unit, as viewed in FIG. 1. As a result, passageways 30, 32 are moved out of registry with valve passageways 18 and 20 as the gate moves toward the closed position, at which the lowermost end of wedge member 28 comes into contact with the interior surface 42 of housing 12 and stops moving. However, gate member 26 continues to move downwardly, resulting in relative sliding movement between wedge member 28 and gate member 26, causing the faces 44, 46 of the gate to move apart by virtue of the wedge surfaces, thereby causing the gate faces 44, 46 to tightly engage the surfaces of respective valve seats 48, 50 in order to prevent flow around the gate and to tightly close the valve.

Housing 12 includes a pair of opposed, axially spaced recesses 52, 54 in the innermost ends of inlet passageway 18 and outlet passageway 20, respectively. Recesses 52, 54 are adapted to receive respective valve seats 48, 50 that each include a sealing surface that is in engagement with respective gate faces 44, 46.

Figure 2:
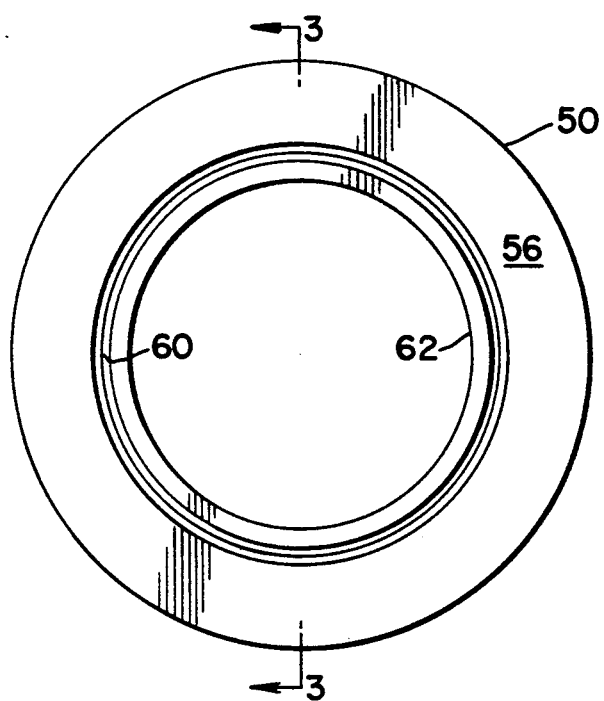
FIG. 2 is a front view of a replaceable valve seat of the type shown in FIG. 1.
Figure 3:
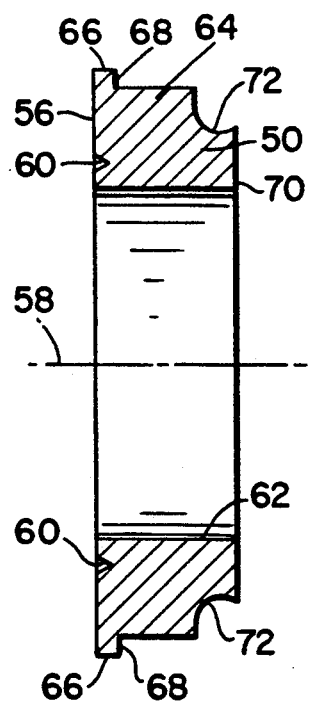
FIG. 3 is a cross-sectional view of the valve seat taken along the line 3—3 of FIG. 2.

Referring now to FIGS. 2 and 3, there is shown in enlarged detail the structure of valve seat 50, which has the same structure as valve seat 48. Thus, it should be understood that although the following description is based upon seat 50, the same description applies to seat 48.

Seat 50 is of generally annular configuration, and includes a flat outer sealing surface 56 that lies in a plane that is perpendicular with the seat axis 58. Sealing surface 56 includes a V-shaped groove 60 that is coaxial with and is positioned radially outwardly of the inner diameter 62 of seat 50. The groove permits an initial release of pressure when the valve is opened and preferably has a depth of about 0.080 in. and an included angle of about 60°.

Seat 50 includes an annular body portion 64 and a flange portion 66 that extends radially outwardly from body portion 64 to define a stop surface 68 when the seat is installed in recess 54 of valve housing 12. The end 70 of seat 50 opposite from sealing surface 56 is of reduced diameter and includes a curved, coaxial, radially outwardly facing annular recess 72 to receive a sealing and biasing ring 74 (see FIG. 4).

Sealing surface 56 is surface hardened to provide a high hardness wear surface that is resistant to abrasion by particles normally found in drilling through the earth. Preferably, the surface hardness of the sealing face is from about 58 to about 60 Rockwell C and can be provided by case carburizing or by nitriding.

As is apparent from the respective drawing figures, seats 48 and 50 of the present invention do not include in the respective sealing faces any outwardly extending protrusions, such as an O-ring, or the like. It is important that the sealing faces of the seats be perfectly flat and smooth, except for the inwardly extending pressure release groove 60.

Figure 4:
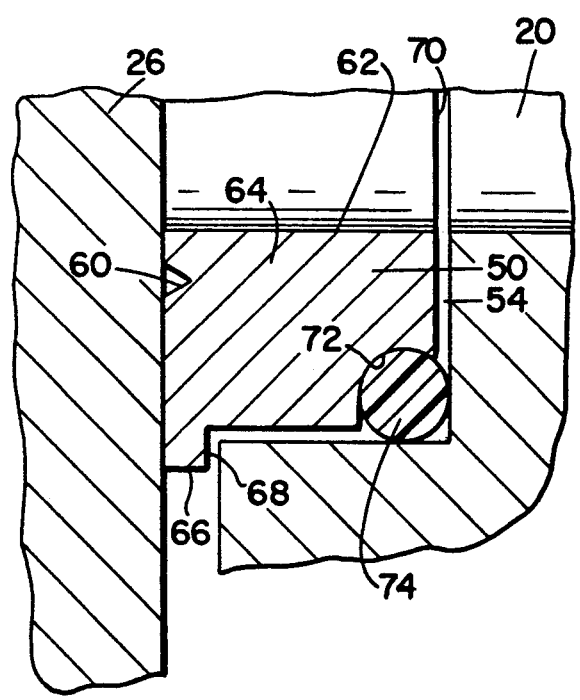
FIG. 4 is an enlarged, fragmentary, cross-sectional view through a valve seat showing its position relative to the valve body and to the gate.

As best seen in FIG. 4, seat 50 is received in recess 54 in valve housing 10, and a resilient biasing ring 74 is provided to resiliently urge seat 50 outwardly from recess 54 and against gate face 46. Biasing ring 74 can be made from a number of suitable materials, such as, for example, Teflon.

As best seen in FIG. 4, the axial length of biasing ring 74 is greater than the axial length of annular groove 72 so that biasing ring 74 extends beyond end face 70 of seat 50 into recess 54 to urge seat 50 outwardly relative to recess 54. It is thus apparent that biasing ring 74 also serves as a sealing ring to prevent the passage of fluid between seat 50 and recess 54.

The outer diameter of seat 50 at body portion 64 is smaller than the diameter of recess 54 in order to permit seat 50 to tilt relative to recess 54, so that sealing face 56 can be maintained in substantially parallel contacting relationship with gate face 46. Preferably, the difference in the diameter of the body portion 64 and of the diameter of recess 54 is of the order of from about 0.010 in. to about 0.020 in. to permit tilting of the seating ring through an angle from about 0.75° to about 2.5°.

It has been found that the provision of valve seats having a high surface hardness, as described above, and being of a floating configuration relative to the valve housing to permit both axial movement of the seat as well as tilting of the seat, relative to the valve housing, provides an effective valve seat that has a considerably longer operating life than the valve and valve seat constructions that are presently commercially available. For example, actual tests utilizing the hereindescribed valve seats under simulated operating conditions involving gritty liquid materials flowing through an expanding gate valve has shown an effective operating life for the present valve construction on the order of about 1000 opening and closing operating cycles, whereas conventional valve structures incorporating non-floating seats that include resilient sealing rings in the face surfaces of the seats have an effective operating life of only about 80 opening and closing operating cycles before sufficient valve leakage occurs to require replacement of the seats. Consequently, the present invention provides significant advantages over the presently commercially available seat structures.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A gate valve having an expanding gate, said valve comprising:
   a. a valve body having a flow inlet and a flow outlet, and a flow passageway extending between the inlet and outlet and having a flow axis;
   b. a gate member positioned within the valve body and movable transversely relative to the flow passageway axis to selectively open and close the flow passageway, the gate member including a pair of abutting gate elements each having opposed wedge surfaces inclined relative to the flow passageway axis to permit the gate elements to be moved relative to each other along respective wedge surfaces to expand the gate member in a direction along the flow passageway axis, the gate elements each having an outwardly facing planar face surface and including a gate passageway through each gate element for alignment with the flow passageway to permit flow through the gate member when the gate element passageways are aligned with the flow passageway, and a spring carried by the gate member for biasing the gate elements toward each other; and
   c. a pair of annular valve seats each having a flow passageway extending therethrough and each carried in a respective seat recess provided within the valve body in spaced relationship along the flow axis and on opposite sides of the gate member, the seats each including a seat face adapted for engagement with the face surface of a respective gate element and including a flat sealing surface without protrusions, each seat face adapted to tightly and sealingly engage a gate face surface and including a closed annular groove free of filler materials and substantially coaxial with the flow passageway, the groove being substantially V-shaped in cross section and having an included angle of about 60° and a depth of about 0.060 inches, he groove dividing the seat faces into a first annular outer planar area free of grooves and a second annular inner planar area free of grooves, the first annular outer planar area being coplanar with the second annular inner planar area, resilient biasing means in the form of a flexible member carried by each seat at a coaxial, radially outwardly facing annular groove at an opposite end of the seat from the sealing surface for contacting a respective seat recess in the valve body to resiliently urge the seat toward the gate face surface, each seat carried in a respective seat recess for sliding movement, the respective seat recesses being so sized to permit tilting of the seats relative to the flow passageway axis through an angle of up to about 2.5° to maintain the seat faces in sealing contact with a respective gate face surface, the seat faces having a surface hardness of about 60 on the Rockwell C scale.

2. A gate valve as claimed in claim 1 wherein the resilient biasing means is a flexible O-ring.

3. A gate valve as claimed in claim 2 wherein the O-ring has a diameter greater than the axial length of the annular groove to permit the O-ring to contact an end surface of an associated recess in the valve body.

* * * * *